United States Patent [19]
Bredereck et al.

[11] Patent Number: 5,473,061
[45] Date of Patent: Dec. 5, 1995

[54] PROCESS FOR THE TREATMENT OF CELLULOSE

[75] Inventors: Karl Bredereck, Stuttgart; Ties Karstens, Botzingen; Harro Lentz, Siegen; Hans Steinmeier, Teningen, all of Germany

[73] Assignee: Rhone-Poulenc Rhodia Aktiengesellschaft, Freiburg, Germany

[21] Appl. No.: 298,399

[22] Filed: Aug. 30, 1994

[30] Foreign Application Priority Data

Sep. 4, 1993 [DE] Germany ............ 43 29 937.7

[51] Int. Cl.⁶ ............... C08B 1/00; C08B 3/00
[52] U.S. Cl. ............ 536/59; 536/56; 536/124; 536/125
[58] Field of Search ............. 536/59, 62, 63, 536/64, 65, 66, 67, 68, 69, 70, 76, 84, 90, 92

[56] References Cited

U.S. PATENT DOCUMENTS

| | | | |
|---|---|---|---|
| 4,491,661 | 1/1985 | Bredereck et al. | 536/98 |
| 4,734,239 | 3/1985 | Diamantoglou et al. | 536/63 |
| 5,177,199 | 1/1993 | Kiesewetter et al. | 536/90 |

FOREIGN PATENT DOCUMENTS 0077287   4/1983   European Pat. Off. .

*Primary Examiner*—Nathan M. Nutter
*Attorney, Agent, or Firm*—Bucknam and Archer

[57] ABSTRACT

The process for the treatment of cellulose for activation for subsequent chemical reactions by bringing the cellulose in contact with liquid ammonia at a pressure higher than atmospheric pressure in a pressure vessel and subsequent expansion by rapid reduction of the pressure to atmospheric pressure, is carried out by using a cellulose pulp of an alpha-cellulose content of at least 92 mass %, letting the ammonia act on the pulp at room temperature or at a temperature higher than room temperature, after the expansion, removing the ammonia then still remaining in the pressure vessel except for a minimum content at which the state of activation reached by the action of the ammonia is still maintained and finally replacing the residual ammonia still needed to maintain the state of activation by another swelling or inclusion agent. The process is suitable, also on a large industrial scale, especially for the activation of pulp subsequently to be acetylated and makes possible to achieve a homogenous and high-grade activation. Further, no costly cooling apparatus is needed.

12 Claims, No Drawings

PROCESS FOR THE TREATMENT OF CELLULOSE

FIELD OF THE INVENTION

The present invention relates to a process for the treatment of cellulose to activate the cellulose for subsequent chemical reactions. The process involves bringing the cellulose in contact with liquid ammonia at a pressure higher than atmospheric pressure in a pressure vessel and subsequent expansion by rapid reduction of the pressure to atmospheric pressure.

BACKGROUND OF THE INVENTION

Cellulose, in particular chemical pulp, which is to be acetylated, must be activated before the acetylation. Normally the activation occurs because the pulp is treated with acetic acid, (see Ullmann's Encyclopedia of Industrial Chemistry, Fifth Complete Revised Edition, Volume A 5, page 440—VCH Verlagsgesellschaft mbH, D-6940 Weinheim, Federal Republic of Germany 1986).

Depending on process conditions, with this known activation process it may happen that homogeneous activation of the pulp does not occur, because the crystalline parts of the pulp are not readily accessible to the pure acetic acid that is glacial acetic acid which is used. The result is that in the following acetylation step, the desired cellulose triacetate stage is reached in the amorphous zones of the pulp prior to the crystalline parts.

From the journal "Acta Polymerica" 32 (1981), No. 3, pages 164 to 171, the use of liquid ammonia for the activation of cellulose is known, namely at normal pressure and at a temperature of 50° to 60° C. The use of liquid ammonia for the activation of cellulose offers the advantage over glacial acetic acid that also the crystalline parts of the cellulose become more accessible due to the expansion of the crystal lattice. However, because of the low temperature, the practical application of this process is rather costly, which may explain the fact that this process is not being employed industrially.

Further, the use of liquid ammonia for the activation of cellulose contained in feed products under application of elevated pressure is known from European Patent Application 0 077 287. According to the process described in this publication, the cellulose-containing material is treated at high pressure with liquid ammonia, and the pressure is rapidly reduced to atmospheric pressure, so that the ammonia boils and the cellulose is defibrated.

The process according to the European Patent Application 0 077 287 is not suitable for the activation of pulp that is subsequently to be acetylated because the ammonia still remaining in the pulp after the expansion will react with the acetylation agent acetic acid and with the acetylation catalyst sulfuric acid, with formation of salts. Due to this fact, the ammonia, in bound form, remains during the acetylation process and in the subsequent saponification process, and at the end, after the precipitation of the cellulose acetate, it goes into the waste water, which is highly undesirable.

When cellulose is activated with liquid ammonia, washing the ammonia out with water at the end of the process is indeed known (see the journal Faserforschung und Textiltechnik 25 (1974), No. 2, pages 57 to 60—Zeitschrift fur Polymerforschung), but according to the above mentioned literature source, the activation with the liquid ammonia occurs at low temperatures or under cooling, and this fact described in "Acta Polymerica" 32 (1981), No. 3, pages 164 has been mentioned in connection with the activation process to 171. This makes the practical application of such an activation process rather costly.

SUMMARY OF THE INVENTION

One object of the present invention is to provide a process for the treatment of cellulose, in particular chemical pulp, for the activation of cellulose for subsequent chemical reactions, in particular for the subsequent acetylation, by means of liquid ammonia, which has the advantage of the activation of cellulose with liquid ammonia, but it is not necessary to apply low temperatures, and after completion of the activation none or very little ammonia remains in the cellulose.

Still another object is to provide a process which permits to achieve also a high-grade and at the same time homogeneous activation, especially with regard to subsequent acetylation reactions.

According to the invention, this problem is solved by a process for the treatment of cellulose and for the activation of cellulose for subsequent chemical reactions which comprises the step of bringing the cellulose in contact with liquid ammonia at higher than atmospheric pressure in a pressure vessel and subsequent expansion by rapid reduction of the pressure to atmospheric pressure, using as cellulose a pulp of an alpha-cellulose content of at least 92 mass %, letting the ammonia act on the pulp at room temperature or a temperature higher than room temperature, after the expansion, removing the ammonia which still remains in the pressure vessel except for a minimum content at which the state of activation reached by the action of the ammonia is still maintained, and lastly, replacing the residual ammonia still needed to maintain the state of activation by another swelling or inclusion agent.

Preferably one selects a quantity ratio of ammonia to pulp 6 mass units of ammonia to 10 mass units of pulp up to 10 mass units of ammonia to 10 mass units of pulp.

Further it is preferred to accomplish the removal of the ammonia remaining in the pressure vessel after the expansion, except for the minimum content of ammonia to maintain the state of activation, by suction, pumping off, blowing off or by heating the contents of the pressure vessel to a temperature which at least corresponds to room temperature.

According to a further preferred embodiment of the process of the invention, the content of residual ammonia still necessary to maintain the state of activation is 2 to 4 mass % ammonia with reference to the mass of the pulp.

In addition, it is preferred to use as the swelling or inclusion agent water, water vapor, superheated steam, an ether, an epoxide, a glycol, a hydrocarbon, a rare gas or carbon dioxide.

Finally, it is preferred to collect the gaseous ammonia escaping during the expansion and to recompress it to liquid ammonia.

For the process of the invention one uses a pressure vessel, i.e. a pressureproof vessel. There are no special requirements for the type of this pressure vessel. Within the scope of the invention, the term "pressure vessel" is to be understood in the broadest meaning. The pressure vessel may be for example an autoclave or, for continuously carrying out of the process, an extruder. The apparatus described in the not yet published German patent application P 42 16 295.5 for quasi-continuous technico-chemical processes in compressed fluids can also be used as pressure vessel for the process of the present invention.

According to the invention, the expansion of the ammonia occurs by rapid reduction of the pressure to atmospheric pressure. By this is meant that the reduction of the pressure to atmospheric pressure is to occur as suddenly as possible, preferably within a period of some few seconds, more especially within a period of less than one second.

To carry out the process of the invention, the pulp is placed in a pressure vessel, such as an autoclave, and acted upon by compressed liquid ammonia. Normally the temperature in the pressure vessel is the ambient temperature, that is, room temperature; but the application of temperatures higher than room temperature is also possible, this being advantageous inasmuch as the subsequent removal of the ammonia from the pressure vessel upon expansion is facilitated.

The following advantages are obtained with the invention:

since the process of the invention does not take place at low temperatures, costly cooling apparatus can be dispensed with;

with the process of the invention a homogeneous and at the same time high-grade activation is obtained;

with the process of this invention, the activation of pulp which is subsequently to be acetylated is possible also on a large industrial scale.

The invention will be explained still more specifically with reference to an example.

EXAMPLE

For the process of the invention a cylindrical autoclave of V4A steel of a capacity of 750 ml was used. This autoclave was charged with 50 g mechanically defibrated pulp. The pulp used had a content of alpha-cellulose of 96 mass %.

Through a valve at the top of the autoclave 50 g liquid ammonia was introduced into the closed autoclave, and then the valve was closed. The temperature in the autoclave was 20° C. After the introduction of the ammonia and at the above mentioned temperature of 20° C., the pressure in the autoclave was 6 bars. The duration of the action of the ammonia on the pulp was 30 minutes.

At the end of this period of 30 minutes the above mentioned valve on the autoclave was opened, whereby the ammonia escaped abruptly and the content of the autoclave was expanded to atmospheric pressure.

To adjust a minimum content of ammonia in the pulp of 4 mass % with reference to the mass of pulp, the autoclave, with the valve opened, was heated for 15 minutes in a waterbath kept at a temperature of 40° C. The desired minimum content of 4 mass % ammonia was checked gravimetrically.

Then steam was introduced into the autoclave through the valve until a pressure of 4 bars was reached therein, whereupon the valve was closed again. The temperature of the steam was 145° C. The duration of the action of the steam on the pulp was 5 minutes. Then atmospheric pressure was restored by reopening said valve.

The pulp was then taken out of the autoclave and acetylated to determine the reactivity. It was found that the acetylation time of this pulp to the cellulose triacetate stage was reduced by 50% as compared with that of a pulp that had been activated by means of glacial acetic acid. The acetylation time for the pulp activated according to this example was only 20 minutes, while the acetylation time for a pulp that had been activated by glacial acetic acid was 40 minutes.

Further it was found that the solution obtained from the acetylation of pulp according to this example, cellulose triacetate solution, was very homogeneous and free from pulp fibers.

What is claimed is:

1. A process for treatment and activation of cellulose for subsequent chemical reactions which comprises the steps of:

a) contacting cellulose pulp of an alpha-cellulose content of at least 92 mass % with liquid ammonia at a pressure higher than atmospheric pressure in a pressure vessel at room temperature or at a temperature higher than room temperature, to obtain said cellulose pulp in the activated state;

b) allowing the ammonia to expand and escape by suddenly reducing the pressure in said pressure vessel to atmospheric pressure, removing the ammonia still remaining in the pressure vessel, except for an amount of residual ammonia necessary to maintain said cellulose pulp in the activated state which is maintained in contact with said cellulose pulp;

c) maintaining said state of activation by replacing said residual ammonia by addition of a swelling or an inclusion agent other than ammonia.

2. The process according to claim 1, wherein in step a) the ratio of the amount of liquid ammonia to said cellulose pulp is 6 mass units ammonia to 10 mass units pulp up to 10 mass units ammonia to 10 mass units pulp.

3. The process according to claim 1 wherein in step a) the temperature is 20° C. and the pressure is 6 bars.

4. The process according to claim 1, wherein removal of said ammonia remaining in the pressure vessel in step b) is carried out by suction, pumping off or blowing off.

5. The process according to claim 1, wherein removal of said ammonia in step b) is carried out by heating the content of the pressure vessel to a temperature which at least corresponds to room temperature.

6. The process according to claim 1, wherein in step b) the amount of residual ammonia still needed to maintain the state of activation is 2 to 4 mass % ammonia with reference to the mass of pulp.

7. The process according to claim 1, wherein said swelling or inclusion agent in step c) is a member selected from the group consisting of water, steam, superheated steam, an ether, an epoxide, a glycol, a hydrocarbon, a rare gas and carbon dioxide.

8. The process according to claim 7, wherein said swelling agent is steam.

9. The process according to claim 8, wherein said steam is at a pressure of 4 bars at a temperature of 145° C.

10. The process according to claim 1, wherein gaseous ammonia escaping during the expansion in step b) is collected and recompressed to liquid ammonia.

11. The process according to claim 7 wherein said swelling or inclusion agent is introduced into said pressure vessel, said pressure vessel has a valve, the valve is closed and then said valve is opened and said residual ammonia evaporates when said valve is opened.

12. The process according to claim 1, wherein one of the subsequent chemical reactions is acetylation of said cellulose.

* * * * *